(12) United States Patent
Alakuijala et al.

(10) Patent No.: US 9,883,192 B2
(45) Date of Patent: Jan. 30, 2018

(54) COLOR SPACE COMPRESSION

(71) Applicant: Google Inc., Mountain View, CA (US)

(72) Inventors: Jyrki Antero Alakuijala, Wollerau (CH); Zoltan Szabadka, Wollerau (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/151,941

(22) Filed: May 11, 2016

(65) Prior Publication Data

US 2016/0337650 A1    Nov. 17, 2016

Related U.S. Application Data

(60) Provisional application No. 62/159,637, filed on May 11, 2015.

(51) Int. Cl.
*G06K 9/00* (2006.01)
*H04N 19/186* (2014.01)
*H04N 5/232* (2006.01)
*H04N 5/235* (2006.01)
*H04N 1/64* (2006.01)
*H04N 9/67* (2006.01)

(52) U.S. Cl.
CPC ............. *H04N 19/186* (2014.11); *H04N 1/64* (2013.01); *H04N 1/648* (2013.01); *H04N 5/235* (2013.01); *H04N 5/23229* (2013.01); *H04N 9/67* (2013.01)

(58) Field of Classification Search
None
See application file for complete search history.

(56) References Cited

U.S. PATENT DOCUMENTS

| 5,172,227 | A | 12/1992 | Tsai et al. |
| 5,359,436 | A | 10/1994 | Dichter et al. |
| 6,633,407 | B1 | 10/2003 | Kim et al. |
| 7,050,065 | B1 | 5/2006 | Young |
| 2006/0274335 | A1* | 12/2006 | Wittenstein ............. G09G 5/02 358/1.9 |

(Continued)

OTHER PUBLICATIONS

International Search Report and Written Opinion for PCT Patent Application No. PCT/US2016/031785, dated Jun. 23, 2016, 12 pages.

(Continued)

*Primary Examiner* — Delomia L Gilliard
(74) *Attorney, Agent, or Firm* — Brake Hughes Bellermann LLP (57) ABSTRACT

An improved color space (YHB model) for compressing image files is provided. An example method includes storing a sum of an unweighted first color value and an unweighted second color value for each pixel in a plurality of pixels of an image as a first channel, subsampling, among the plurality of pixels, a difference between the first color value and the second color value as a second channel, subsampling, among the plurality of pixels, a third color value as a third channel, and storing the first channel, the second channel, and the third channel as the compressed image. In some implementations, the original image may be split into a low frequency version and a high frequency version. The system may apply the YHB model to the high frequency version and apply a conventional model or a second variation of the YHB model to the low frequency version.

20 Claims, 7 Drawing Sheets

(56) References Cited

U.S. PATENT DOCUMENTS

2011/0182510 A1* 7/2011 Hong .................... G06T 3/4015
                                                              382/167

OTHER PUBLICATIONS

Ford et al., "Colour Space Conversions", retrieved from www.poynton.com/PDFs/coloureq_pdf, Aug. 11, 1998, 31 pages.
Luthra et al., "Call for Evidence (CfE) for HDR and WCG Video Coding", ISO/IEC JTC1/SC29/WG11 MPEG 2014/N15083, Feb. 2015, 47 pages.
Google, "butteraugli—a tool for measuring differences between images," https://github.com/google/butteraugli; 2016 GitHub, Inc.; Feb. 4, 2016, printed Apr. 21, 2016, 2 pages.
Google, "Tuning. Fix handling of transparency in compare_pngs."; https://github.com/google/butteraugli/commit/c2bee2613f701089ccbc2fb0de8491d3af4d8d9d; 2016 GitHub, Inc.; Feb. 4, 2016, printed Apr. 21, 2016, 24 pages.

* cited by examiner

| Y=435 H=-35 B=25 | Y=435 | Y=420 | Y=419 |
| Y=436 | Y=436 | Y=430 | Y=425 |
| Y=435 | Y=415 | Y=405 | Y=400 |
| Y=420 | Y=410 | Y=400 | Y=391 |

COLOR SPACE COMPRESSION

RELATED APPLICATION

This application is a non-provisional of, and claims priority to U.S. Provisional Application No. 62/159,637, filed May 11, 2015, entitled "Improved Color Space Compression," the disclosure of which is incorporated herein in its entirety.

BACKGROUND

Digital images are often captured in an RGB color space with a red component, a green component, and a blue component. To reduce image size, some systems use lossy compression, which reduces the amount of information stored for the image. Conventionally lossy compression includes keeping intensity information for an image and losing some of the color information. One example of lossy compression is the JPEG image format, which uses a YUV color space, specifically YUV 420. This color space dates back to the transition of black-and-white TV to the color era, carrying luminance information on the Y channel, and chroma information on the U and V channels. With the separate channels, black-and-white sets could easily separate out the luminance information. The YUV color space also assumes highest spatial sensitivity for a mixture that is highest on the green component.

SUMMARY

Implementations provide an improved color space that allows for much greater data compression. The new color space, also referred to as the YHB color space, exploits the anatomy of the human eye to compress color information in an image without losing perception. The YHB color model greatly reduces the information kept for the blue component of a color signal by keeping the blue component a separate subsampled channel. The YHB color model also does not favor the green component, unlike current models. Instead, the YHB color space uses additive red and green information for all pixels and the difference between the red and green information for a subsample of pixels. The subsampling rate on the blue channel and the channel carrying the difference between red and green can be much higher than subsampling on chroma channels, such as the U and V channels in the YUV color space.

According to one aspect, a method of generating a compressing an image that includes a plurality of pixels includes storing a sum of an unweighted first color value and an unweighted second color value for each pixel in the plurality of pixels as a first channel, subsampling, among the plurality of pixels, a difference between the first color value and the second color value as a second channel, subsampling, among the plurality of pixels, a third color value as a third channel, and storing the first channel, the second channel, and the third channel as the compressed image.

According to one aspect, an image capture device can include a camera assembly, a processor, and one or more memories. The memories may be configured to store images captured by the camera assembly, each image including a plurality of pixels, each pixel having a first color value, a second color value, and a third color value. The memories may also be configured to store compressed images and instructions that, when executed by the processor, cause the image capture device to perform operations on an image of the images captured by the camera assembly. The operations may include calculating, for each pixel in the image, a sum of the first color value and the second color value, subsampling, among the plurality of pixels for the image, a difference between the first color value and the second color value, subsampling, among the plurality of pixels for the image, a third color value, and storing the sums, the subsampled differences, and the subsampled third color values as a compressed image in the memory.

According to one aspect, a method of converting a block of pixels from an image encoded using an RGB color space to a YHB color space includes (a) calculating an intensity value for each pixel in the block by summing a green component and a red component for the pixel; (b) for a first subsample of pixels in the block of pixels, calculating a hue value by determining a difference between the green component and the red component; (c) for a second subsample of pixels in the block pixels, using a blue component for the pixel as a blue value; and (d) storing the intensity values, the subsampled hue value, and the subsampled blue value for the block of pixels.

According to one aspect, a method includes generating a low frequency version of an original image and generating a high frequency version of the original image. The method also includes compressing the low frequency version in a first variation of a YHB color space and compressing the high frequency version in a second variation of a YHB color space.

According to one aspect, a method includes generating a low frequency version of an original image captured by a camera assembly, generating a high frequency version of the original image, compressing the low frequency version in a conventional color model; and compressing the high frequency version in a YHB color model.

Another aspect of the disclosure can be embodied on a computer-readable medium having recorded thereon instructions that, when executed by a processor of a computing device, cause the computer device to perform any of the disclosed methods, operations, or processes. Another general aspect includes a system and/or method for lossy compression of an image using a sum of a first color channel and a second color channel, and subsampling of the difference between the first and second color channels, and subsampling of a third color channel, substantially as shown in and/or described in connection with at least one of the figures, and as set forth more completely in the claims disclosed herein.

One or more of the implementations of the subject matter described herein can be implemented so as to realize one or more of the following advantages. As one example, systems and methods provide a compression rate that is twice as much as current JPEG compression without a noticeable difference to viewers. This size reduction results in much faster transmission of images, which is valuable for applications such as video streaming, which transmit a series of compressed images. The conversion from RGB to YHB is much simpler and faster to compute than RGB to YUV, which provides a further benefit for image capturing applications.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
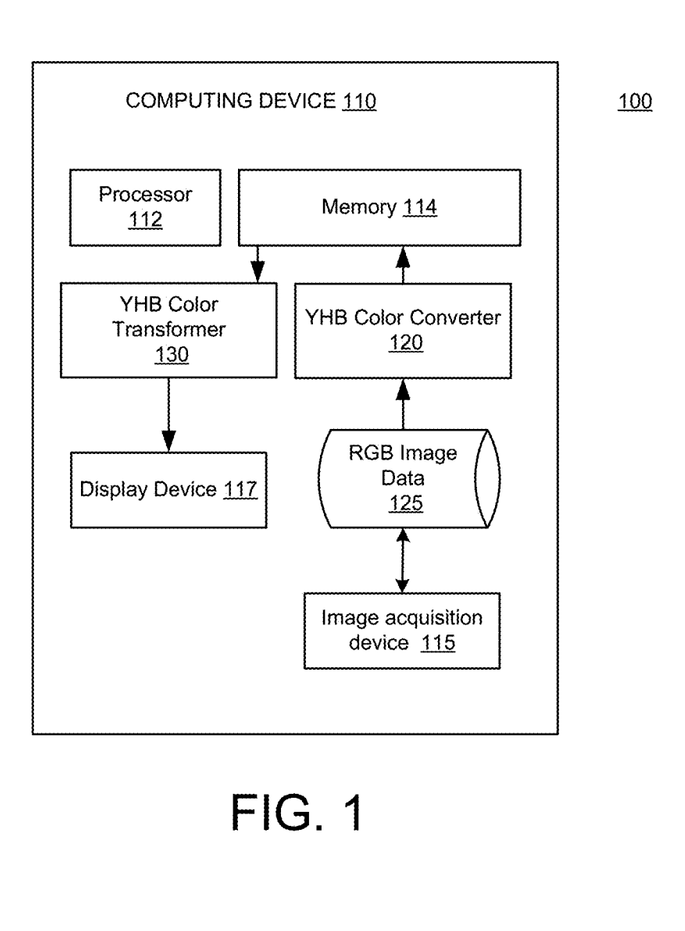
FIG. 1 illustrates an example system in accordance with the disclosed subject matter.

FIG. 1 is a block diagram of an improved image compression system in accordance with an example implementation. The system 100 may be used to compress image information without losing perception. The system 100 is able to achieve more than twice the compression rate of conventional lossy compression without loss of perception, which improves the functioning of a computing device by enabling the storage of more images using the same amount of memory. The system also benefits data transfer applications, such as uploading an image from a mobile device to a cloud server or streaming video from a server to a personal computing device, because more images can be transmitted in the same bandwidth. The improved image compression system 100 also improves the image capture and conversion time by reducing the complexity of conversion from the RGB color space into the improved compressed color space (i.e., the YHB color space).

Figure 7:
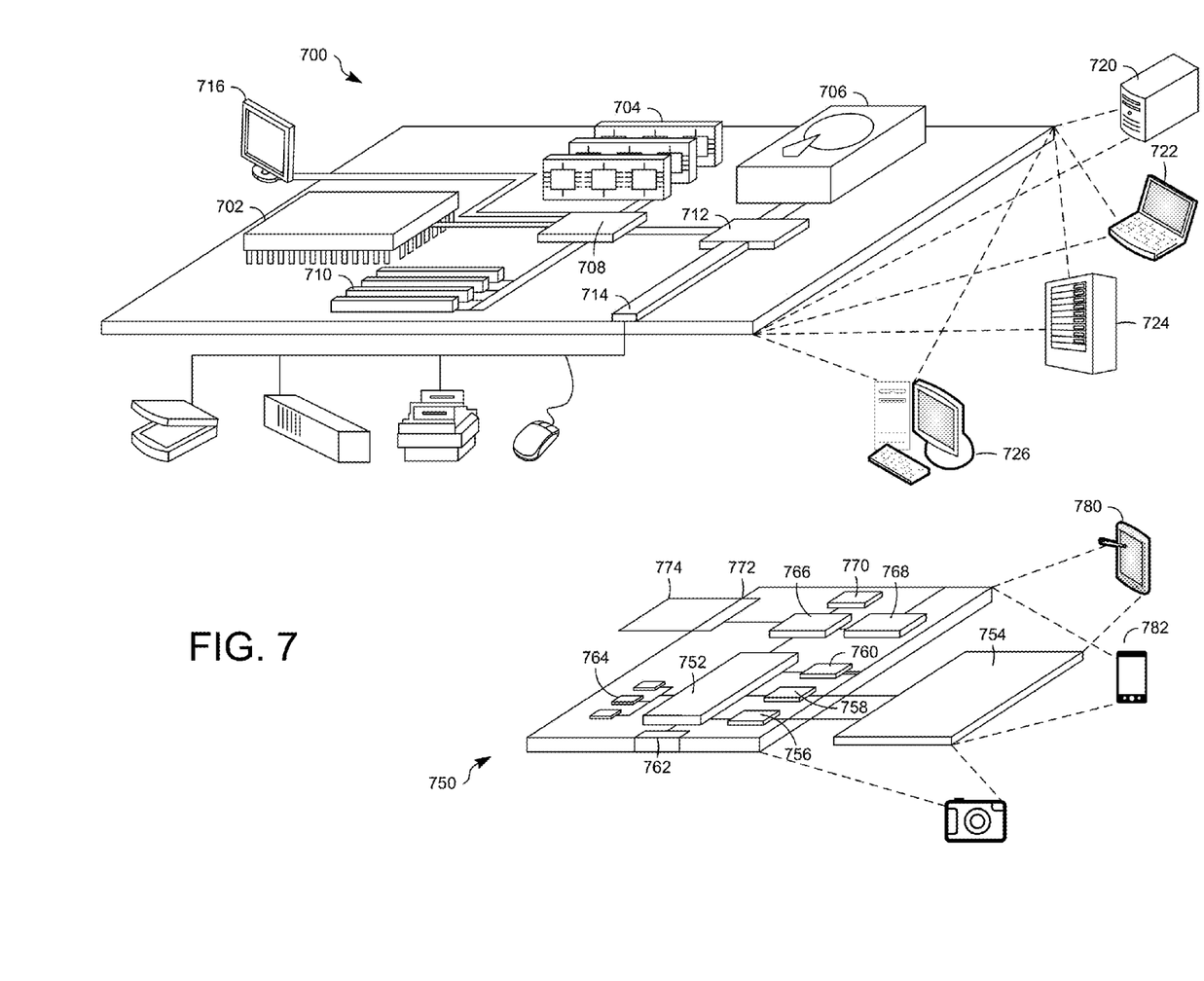
FIG. 7 shows an example of computer devices that can be used to implement the described techniques.

The improved image compression system 100 may include a computing device 110, which may be a computing device or devices that take the form of a number of different devices, for example a standard server, a group of such servers, or a rack server system, a personal computing device, a mobile computing device, a wearable computing device, a digital camera, a scanner, or any other device that includes a camera. The computing device 110 may be an example of computer device 700 or device 750, as depicted in FIG. 7.

The computing device 110 can include one or more processors 112 formed in a substrate that are configured to execute one or more machine executable instructions or pieces of software, firmware, or a combination thereof. The computing device 110 can also include an operating system (not shown) and one or more computer memories. The memories can be, for example, a main memory, a cache memory, flash memory, memory card (e.g., SIM card, SD card, etc.), disk memory, etc. For example, RGB image data 125 may be an example of volatile memory or a non-volatile memory for storing images acquired from the image acquisition device 115. In another example memory 114 may be main memory, cache, disk, a SIM card, or some other non-volatile memory. In one implementation, the memory 114 may be removably coupled to computing device 110. The memories may also include memories configured to store one or more pieces of data, either temporarily, permanently, semi-permanently, or a combination thereof. In general, memories of computing device 110 may include any type of storage device that stores information in a format that can be read and/or executed by the one or more processors 112.

The memories may store modules that, when executed by the one or more processors 112, perform certain operations. In some implementations, the modules may be stored in an external storage device and loaded into the memory of computing device 110. The modules may include YHB color converter 120 and YHB color transformer 130. The YHB color converter 120 may take image information in the RGB color space and convert it into the YHB color space. The RGB color space is based on an additive color model. The RGB color space encodes colors in the form of three components, a red component, a green component, and a blue component. If all three components are at highest intensity and combined together, the result is white. When all three components are at lowest intensity, the result is black. In conventional RGB color space, each component may range from 0 (lowest intensity) to 255 (highest intensity). The RGB color space produces an array of colors by combining each of the components at differing intensities.

The YHB color space reduces the information stored for an image while still retaining perception. In other words, when displayed on a display device, such as display device 117, a human viewer is generally unaware of differences between the image generated from the compressed image data and the image generated from the uncompressed image data. Older color models, such as YUV 420, YCbCr, and Y'CbCr, are a practical approximation to color processing and perceptual uniformity, but do not match the receptor cell densities on the retina. The YHB color model better matches these cell densities. For example, the YHB color space differs from older color models in that the blue component has its own subsampled channel and green is not emphasized over red and blue. Older color models, such as the YUV 420, YCbCr, and Y'CbCr, color models, use less red accuracy and emphasize the green component at the highest spatial component (e.g. the intensity component). For example, the YUV 420 weights the green component almost twice as much as the red component in calculating the intensity channel (i.e., Y channel). Such emphasis of green in the intensity channel leads to a suboptimal experience for people with a low green cone count. The YHB color model does not favor the green component providing an image that leads to an equally good experience for all people. The computing device 110 may include image acquisition device 115. The image acquisition device 115 may be any type of digital camera and may include components such as a lens, a shutter, an image sensor, etc. The image acquisition device 115 may also be a scanner. The image acquisition device 115 may be configured to acquire images in an RGB color space. The images may be a still picture or a video (i.e., a sequence of images). In some implementations, the image acquisition device 115 may store an acquired image, for example in RGB image data 125. In some implementations, this may be temporary storage used to provide data to the YHB color converter 120. In some implementations, the RGB image data 125 may be non-volatile storage such that the RGB image data for an acquired image is stored until deleted by a user of the computing device 110.

Conventionally, an acquired image has a red, green, and blue component for each pixel in the acquired image. The YHB color converter 120 may be configured to convert the red, green, and blue components of the RGB image data 125 (e.g., for each pixel) to an intensity (Y) channel, a hue (H) channel, and a blue (B) channel. In a YHB color space, the intensity value (or in other words the value of the intensity channel for a pixel) may be the sum of the red component and the green component for a pixel. In other words, if the image data for a pixel in RGB image data 125 has a red component of 123, a green component of 253, and a blue component of 36, the YHB color converter calculates the intensity value for the pixel as (123+253) or 376. Unlike YUV color spaces (including variations like YCbCr), the intensity value of the YHB color space may lack any information from the blue component. The YHB color converter 120 may also calculate the hue (H) value for the pixel (or in other words, the value of the hue channel for the pixel) by taking the difference between the red component and the green component. Using the example above, the YHB color converter 120 may calculate the hue value for the pixel as (123−253) or −130. To aid in compression, the YHB color converter 120 may subsample the hue channel. Subsampling means that the hue value for some pixels is not used, e.g., is deleted or thrown out. The number of hue values discarded for the hue channel depends on the compression rate. The YHB color space can support a compression rate of 16:1. This means that for every sixteen pixels, the YHB color converter 120 keeps only one hue value. This is higher than the best compression rate of JPEG (which has a compression rate of at most 4:1:1), which keeps every fourth chroma value for the U and V channels.

As indicated above, the first two channels in the YHB color space may lack any information from the blue component. Instead, the YHB color space simply takes the blue component and places it in its own channel, the blue (B) channel. Thus, using the example above, the YHB color converter 120 sets the blue value of the pixel (e.g., the value of the pixel in the blue channel) to 253. In other words, the blue component is not mixed with the red and green components of the RGB color space at all. However, the YHB color converter 120 also subsamples the blue channel. The YHB color space can support a compression rate of 16:1 for the blue channel and, therefore, may discard the blue value of fifteen of every sixteen pixels. Thus, the subsampling rate of the YHB color space can achieve compression ratios of (16:1:1). This compression rate means the computing device 110 can transfer less bytes per image and use less memory to store the image. In some implementations, the image acquisition device 115, the RGB image data 125, and the YHB color converter 120 may be considered an image capture device. In some implementations, the computing device 110 may be considered an image capture device.

The YHB color converter 120 may store the subsampled image data, e.g., in the form of intensity, hue, and blue channels, in memory 114. The computing device may be able to transfer the compressed image data to another computing device from memory 114, or may recall the image data from memory 114 to display on a display device. The computing device 110 may use YHB color transformer 130 to convert the image data in the YHB color space back into the RGB color space or another color space so that it can be displayed on the display device 117. The display device 117 may be a monitor, a touch screen, a television, or other similar type of display device. Such a display device may use LEDs, CCFLs, or another light source to produce an image on the display device 117 in color using the RGB color space. In some implementations, the display device 117 may be a printing device. Printing devices typically use a subtractive model, like CMYK, rather than an additive color space such as RGB. Therefore, when the display device 117 is an ink-based device rather than a light-based device, the YHB color transformer 130 may convert the YHB channels directly into a subtractive model, such as CMYK, or may convert the YHB color channels to RGB and then from RGB to CMYK.

For example, the YHB color transformer 130 may be configured to receive an image compressed in the YHB format and to transform the intensity, hue, and blue channels back into RGB components. Because each pixel in the RGB color scheme needs a blue, red, and green value, the YHB color transformer 130 may be configured to distribute the hue value and blue value across subsampled pixels. As discussed above, it is possible for fifteen pixels to have no information for the blue channel and the hue channel. The YHB color transformer 130 thus distributes the subsampled blue value and hue value to pixels missing these values. This distribution may result in invalid values for the red and green components (e.g., a negative value). In some implementations, the YHB color transformer 130 may clamp such invalid values to zero. In some implementations the YHB color transformer 130 may distribute the error across neighboring pixels, clamping any invalid values to zero if needed. Because the blue value is preserved, the blue channel has no need for error correction. The YHB color transformer 130 may provide the resulting RGB components to the display device 117. The YHB color transformer 130 may convert the intensity, hue, and blue values into another additive color model or a subtractive color model. The techniques for such transformations are understood given the explanation of transforming YHB to RGB disclosed herein.

Although not illustrated in FIG. 1, the computing device 110 can include other modules or processes that use the images stored in memory 114, the YHB color transformer 130, and the YHB color converter 120. For example, the computing device 110 may include a video editing module, a video or picture transfer module, a video streaming module, a messaging module or email module that attaches pictures, etc. The computing device 110 may include other components, not illustrated, for communicating with other devices. For example, the computing device 110 may include various network interface circuitry, such as for example, a mobile network interface through which the computing device can communicate with a cellular network, a Wi-Fi network interface with which the computing device can communicate with a Wi-Fi base station, a Bluetooth network interface with which the computing device can communicate with other Bluetooth devices, and/or an Ethernet connection or other wired connection that enables the computing device 110 to access a network, such as the Internet or an intranet. The computing device 110 may include other sensors such as, for example, an ambient light sensor, a temperature sensor, an accelerometer, etc.

Figure 2:
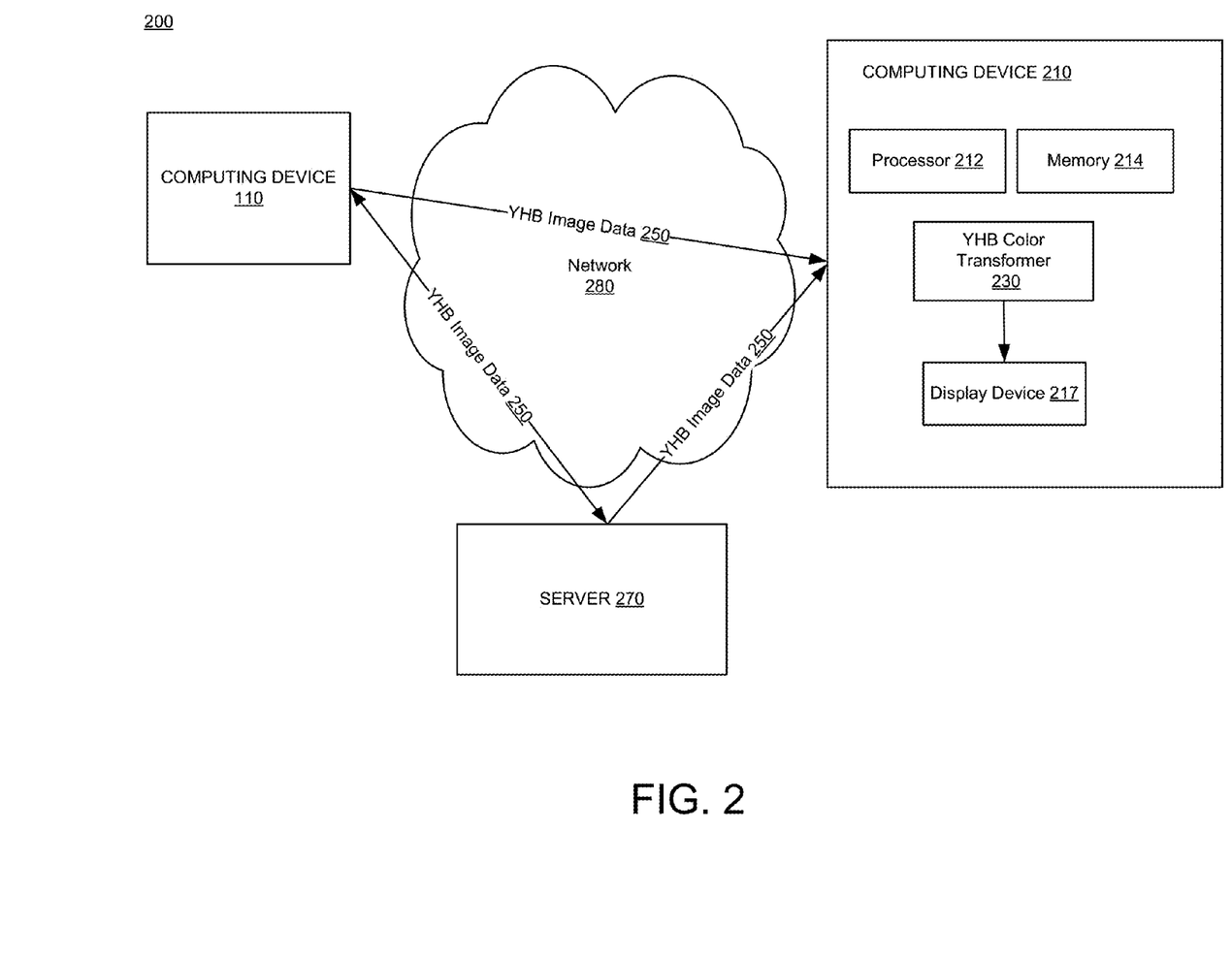
FIG. 2 illustrates another example system in accordance with the disclosed subject matter.

FIG. 2 illustrates another example system in accordance with the disclosed subject matter. In the example system 200 of FIG. 2, the computing device 110 may transmit an image compressed using the YHB color space to another computing device 210 or to a server 270. The computing device 210 has similar components as computing device 110 discussed above, although computing device 210 is only illustrated processors 212, memory 214, YHB color transformer 230, and display device 217. In the example of FIG. 2, the computing device 110 may capture an image and may convert the image to the YHB color space, e.g., using YHB color converter 120. The computing device 110 may then transfer the compressed image data (e.g., the output of YHB color converter 120) to the receiving computing device 210 using conventional techniques. In one example, the computing device 110 may transmit the compressed image data 250 via a network 280. Network 280 may be for example, the Internet, or the network 280 can be a wired or wireless local area network (LAN), wide area network (WAN), a Bluetooth connection, etc., implemented using, for example, gateway devices, bridges, switches, and/or so forth. The computing device 210 may receive the compressed image data 250 and may store a copy of the image. In some implementations, the YHB color transformer 230 may receive the image data and convert it to the RGB color space (or another additive or subtractive color space) and provide the converted image data to the display device 217 for display. Because the of high compression rate of the YHB image data 250, transmission may occur faster than transmission of the same picture encoded in a different color space, such as YUV or YCbCr.

In some implementations, computing device 110 may provide the compressed image data 250 to a server 270. The server 270 may be communicatively connected to the computing device 110, e.g., via network 280. Server 270 is another example of computer device 700, as depicted in FIG. 7, and may represent a distributed computing network. As one example, the server 270 may be a server serving as a repository for images for a user of the computing device 110. The server 270 may store the image data 250 and can provide it (with consent of the user of computing device 110) to computing device 210. In some implementations, the server 270 may be the source of the compressed image data 250 and may provide the image data to the computing device 110, where the YHB color transformer 130 may convert the image data 250 into a format appropriate for display device 117. For example, the server 270 may be a media streaming server and may provide a video broadcast, compressed using the YHB color space, to the computing device 110 for viewing.

Figure 3:
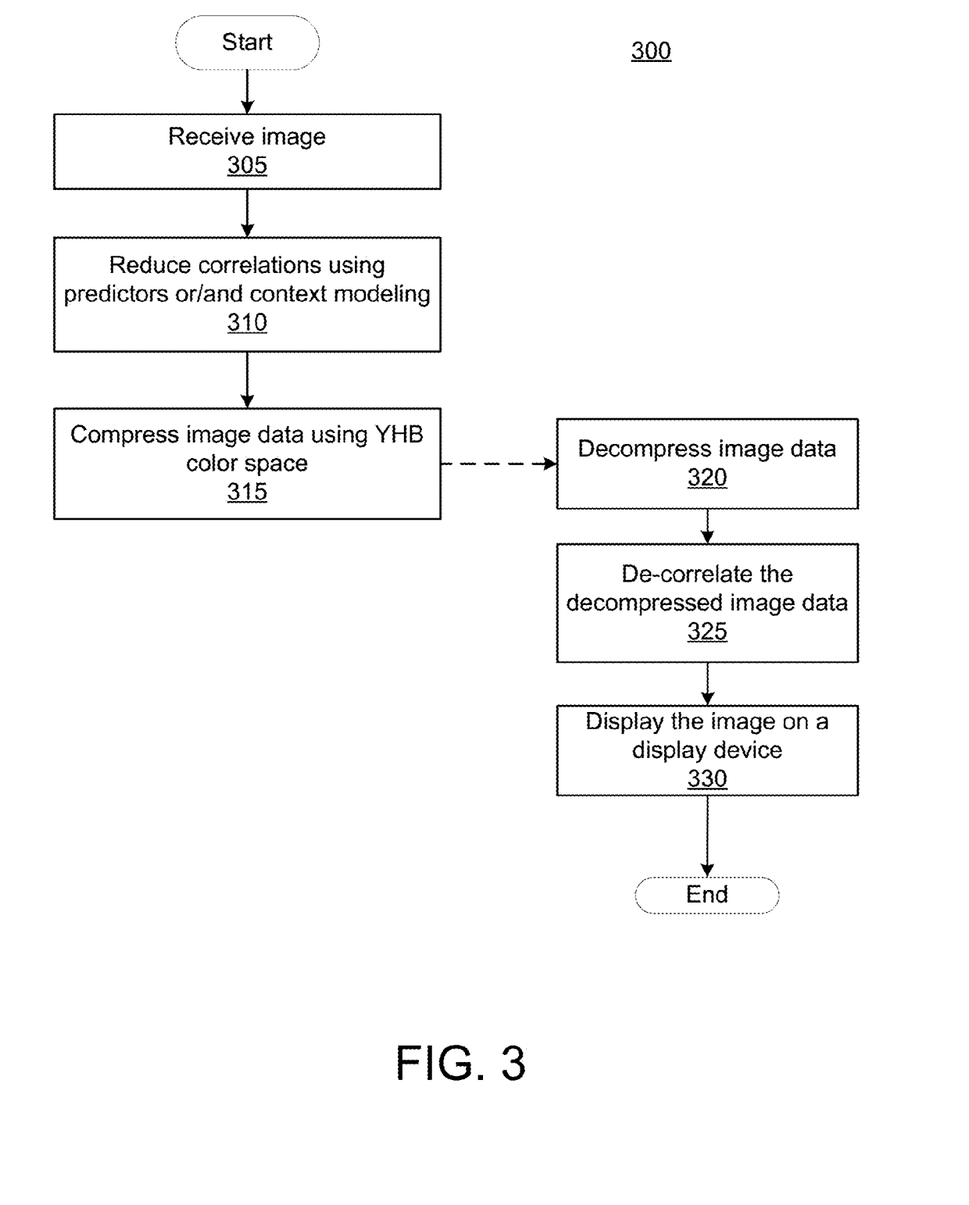
FIG. 3 illustrates a flow diagram of an example process for compressing image data, in accordance with an implementation.

FIG. 3 illustrates a flow diagram of an example process 300 for compressing image data, in accordance with an implementation. Process 300 may be performed by an improved image compression system, such as system 100 of FIG. 1 or 200 of FIG. 2. Process 300 may be performed on a single computing device or can be completed on different computing devices, for example with a first computing device performing the first three steps and the second device performing the last three steps. In some implementations, the first three steps may be performed by YHB color converter and the last three steps by YHB color transformer. Process 300 begins with receive of image data (305). The image data can represent image data acquired by an image acquisition device, such as a camera or scanner. The image data may be in an RGB color space or the system may convert the image data to an RGB color space (not shown).

The system may then reduce correlations in the image data (310). Reducing the correlations may be performed on each color channel, e.g., the red, green, and blue. Conventional color models, such as YCbCr and Y'CbCr, are an attempt to remove correlations from the RGB image data, but mix correlations that are spatially different because they entangle the blue channel into the other channels. The YHB color model separates out the spatially different correlations, enabling the use of more modern data compression methods, such as predictions and context modeling, to model the correlations. In a prediction model the system moves the simple correlations between color components to reflect the properties of the world in the signal. In other words, prediction finds a linear combination that removes the correlation best. In context modeling, the system may store blue statistics at different levels of intensity, as there could be more blue at low intensity areas and more yellow in high intensity areas. In some implementations, as a result of compressing the image using predictors and/or context modeling, the system may use a first codification for blue for dark areas and a different codification for blue in bright areas. Such a scheme is not possible for conventional color spaces as they mix blue into the different channels.

Figure 4:
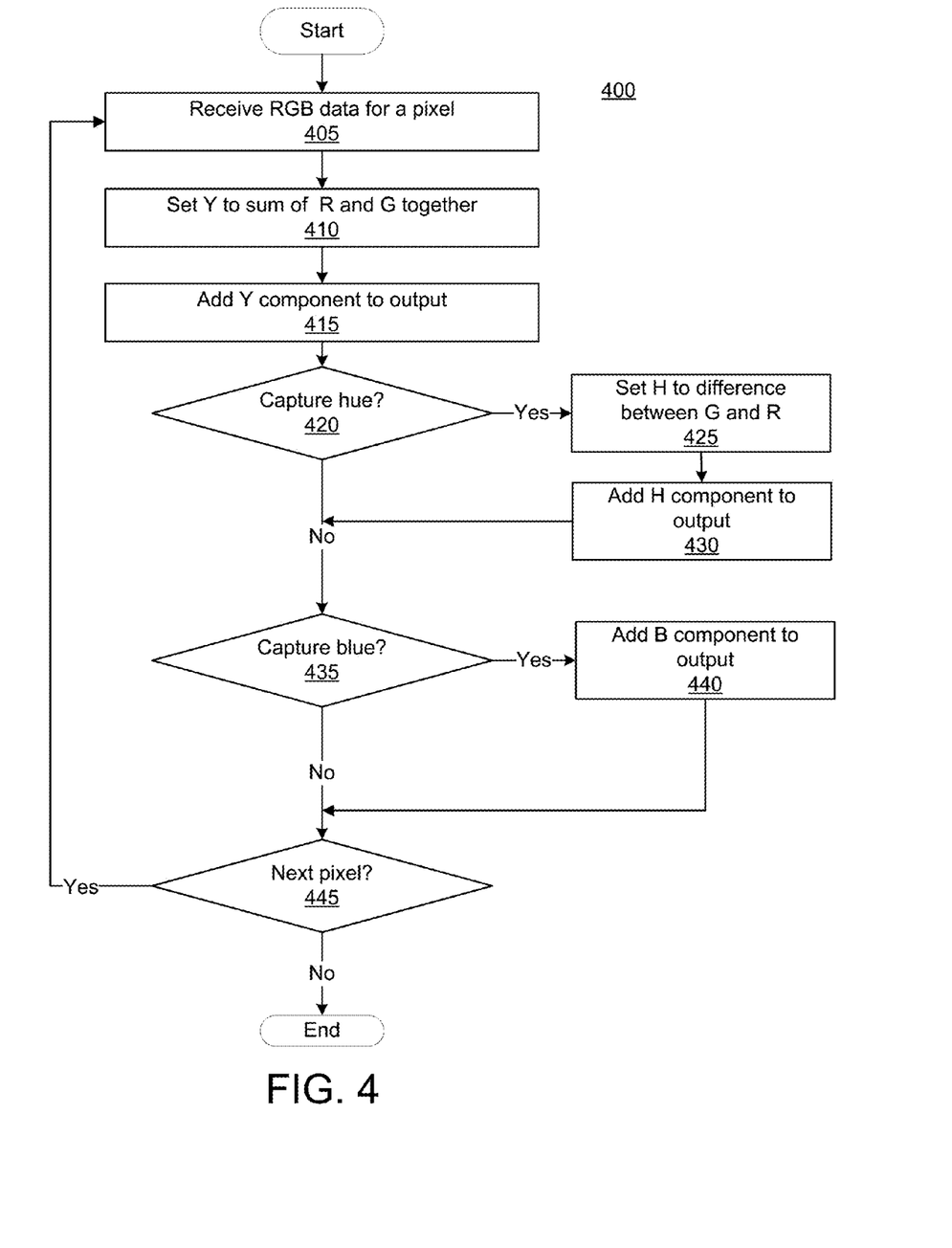
FIG. 4 illustrates a flow diagram of an example process for converting color information into the YHB color space, according to an implementation.

The system may then compress image data by converting the image data to the YHB color space (315). This is explained in more detail with regard to FIG. 4. FIG. 4 illustrates a flow diagram of an example process 400 for converting color information into the YHB color space, according to an implementation. Process 400 may be performed by an improved image compression system, such as system 100 of FIG. 1 or 200 of FIG. 2. In some implementations, the process 400 may be performed by YHB color converter 120. In some implementations, the YHB color converter may be included in an image acquisition device, such as a camera or scanner. Process 400 may enable an improved image compression system to perform lossy compression on image data. The lossy compression of process 400 results in a much smaller file than conventional compression and is faster to compute. Because process 400 results in loss of data, the images may be best viewed on smaller screens at a high level of zoom. Zooming in on the image when displayed (e.g., after converted back into RGB) may result in artifacts. Artifacts are distortion caused by lossy compression and occur in other compression formats such as YUV. Process 400 may also be referred to as entropy encoding.

Process 400 may begin by receiving RGB data for a pixel (405). Each pixel in image data may have a red component, a green component, and a blue component with a value that ranges from 0 to 255. In some implementations, the system may calculate the intensity (or Y) value for the pixel as the sum of the red and green component values (410). The system may keep this sum for each pixel and, therefore, may add the y component to the output (415). The output is a data file that represents the compressed image data. In some implementations (not shown), the system may calculate the intensity component as the sum of the red, green, and blue component values. Such implementations have fewer artifacts but take longer (are more expensive) to calculate.

The system may then determine whether to capture the hue component (420). As indicated above, the hue component may be subsampled at a rate up to 16:1. This means that for every sixteen pixels only one pixel has the hue captured. If the sampling rate is 4:1, then the system captures the hue for every fourth pixel. If the system captures the hue (420, Yes), the system may calculate the hue value as the difference between the red and the green component values for the pixel (425). In some implementations, this may be subtracting the red from the green. In some implementations, this may be subtracting the green from the red. As long as the compression component (e.g., the YHB color converter) and the transformer component (e.g., the YHB color transformer) operate the same (e.g., both use red minus green), the system can use either difference. In some implementations, the system may calculate the hue for every pixel and may determine after the calculation whether to capture the hue. In other words, the order of 420 and 425 may be reversed. If the hue is captured, the system may add the hue value to the output (430). If not (420, No), the hue information for the pixel is discarded.

The system may also determine whether to capture the blue component (435). As indicated above, the blue component may also be subsampled at a rate up to 16:1. This means that for every sixteen pixels only one pixel has the blue captured. The sampling rate for blue need not match the sampling rate for hue. For example, the sampling rate for hue may be 4:1 and the sampling rate for blue may be 16:1. In other words, the subsampling of the hue channel can occur at a higher rate that the subsampling of the blue channel. If the system captures the blue (435, Yes), the system may add the blue component value to the output (440). There is no calculation or transformation of the blue component value because it is not combined with the other channels. If the blue is not captured (435, No), the blue information for the pixel is discarded.

The system may repeat steps 405 to 440 for the remaining pixels in the input file (445 Yes). When no more pixels are left for conversion (445, No), process 400 ends. In some implementations, process 400 may be expressed in terms of a matrix. For example, starting with RGB values, calculating the components of a pixel may be expressed as $$\begin{bmatrix} Y \\ H \\ B \end{bmatrix} = \begin{bmatrix} 1 & 1 & 0 \\ -1 & 1 & 0 \\ 0 & 0 & 1 \end{bmatrix} \times \begin{bmatrix} R \\ G \\ B \end{bmatrix}$$

The system may then determine whether to keep or discard the H and B values. For example, the system may always output the Y value, and may output the H value and the B value according to their corresponding subsampling rates (e.g., once for every sixteen pixels). The matrix above calculates the hue as the red component subtracted from the green component. If the system calculates the hue as the green component subtracted from red, the values in the middle row, first and second columns would be swapped. As described above, in some implementations, the intensity channel may be the sum of the red, green, and blue values. In this case, the process 400 may calculate the YHB components of the pixel using the matrix equation $$\begin{bmatrix} Y \\ H \\ B \end{bmatrix} = \begin{bmatrix} 1 & 1 & 1 \\ -1 & 1 & 0 \\ 0 & 0 & 1 \end{bmatrix} \times \begin{bmatrix} R \\ G \\ B \end{bmatrix}$$

As indicated above, including the blue in the intensity channel may be more expensive to calculate (e.g., resulting in slower processing times), but will result in less artifacts when zooming into the picture on the display device. Thus, a tradeoff may be made depending on processing time and loss of information.

In some implementations, the system may process a block of pixels. For example for every sixteen pixels, the system may save all sixteen Y values together and then may save the H values after the sixteen Y values, and the B values after the H values. The number of H values and B values saved at the end of the sixteen Y values depends on the respective subsampling rates. Of course, the system may also intersperse the H and B values with the Y values.

Figure 5:
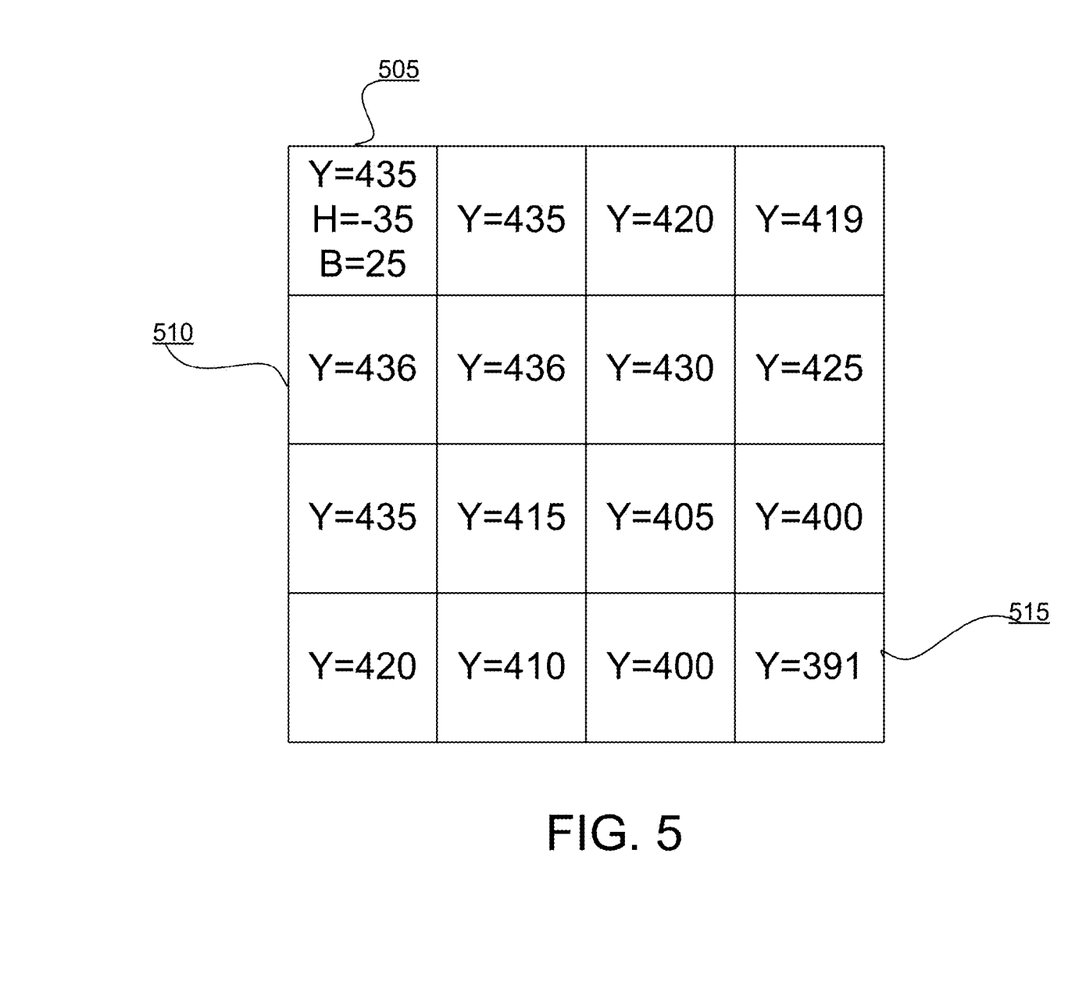
FIG. 5 illustrates an example schematic of a 4×4 pixel block encoded in the YHB color space, according to an implementation.

FIG. 5 illustrates an example schematic of a 4×4 pixel block encoded in the YHB color space, according to an implementation. In the example of FIG. 5, the hue and blue channels are both subsampled at a rate of 16:1. This may also be written as 16:1:1. FIG. 5 illustrates a first pixel 505 that has an intensity (Y), a hue (H), and a blue (B) value. The remaining pixels in the 4×4 block have only the intensity (Y) value. The system may calculate the red, green, and blue components for each pixel in the block based on the values shown. For example, if the system calculated the hue by subtracting the green component from the red component, the system may determine the red component for pixel 505 as (435+(−35))/2 or 200. The green component may be calculated as the intensity value minus the red component, 435−200, or 235. The blue component is the same as the blue value, 35. The system may take the hue and blue values of pixel 505 and distribute the values to the remaining pixels in the block when transforming from YHB to RGB. For example for pixel 510, the system may calculate the red component at (436+(−35))/2 or 201. This makes the green component 235 (or 436−201). For pixel 515, the system may calculate the red component as 178 (or (391+(−35))/2) and the green component as 213 (or 391−178). The blue component for pixels 510 and 515 may remain 25.

In some implementations, the blue component may be added into the intensity value. Using the example of FIG. 5 in such an implementation, the system may calculate the red component of pixel 510 as (435+(−35)−25)/2 or 188. This makes the green component 223 for pixel 510. Similarly, the system may calculate the red component of pixel 515 as 165.5 and the green component as 200.5. As indicated earlier, adding the blue component to the intensity component is slightly more difficult to calculate (and may slightly increase processing time), but reduces some artifacts.

Figure 6:
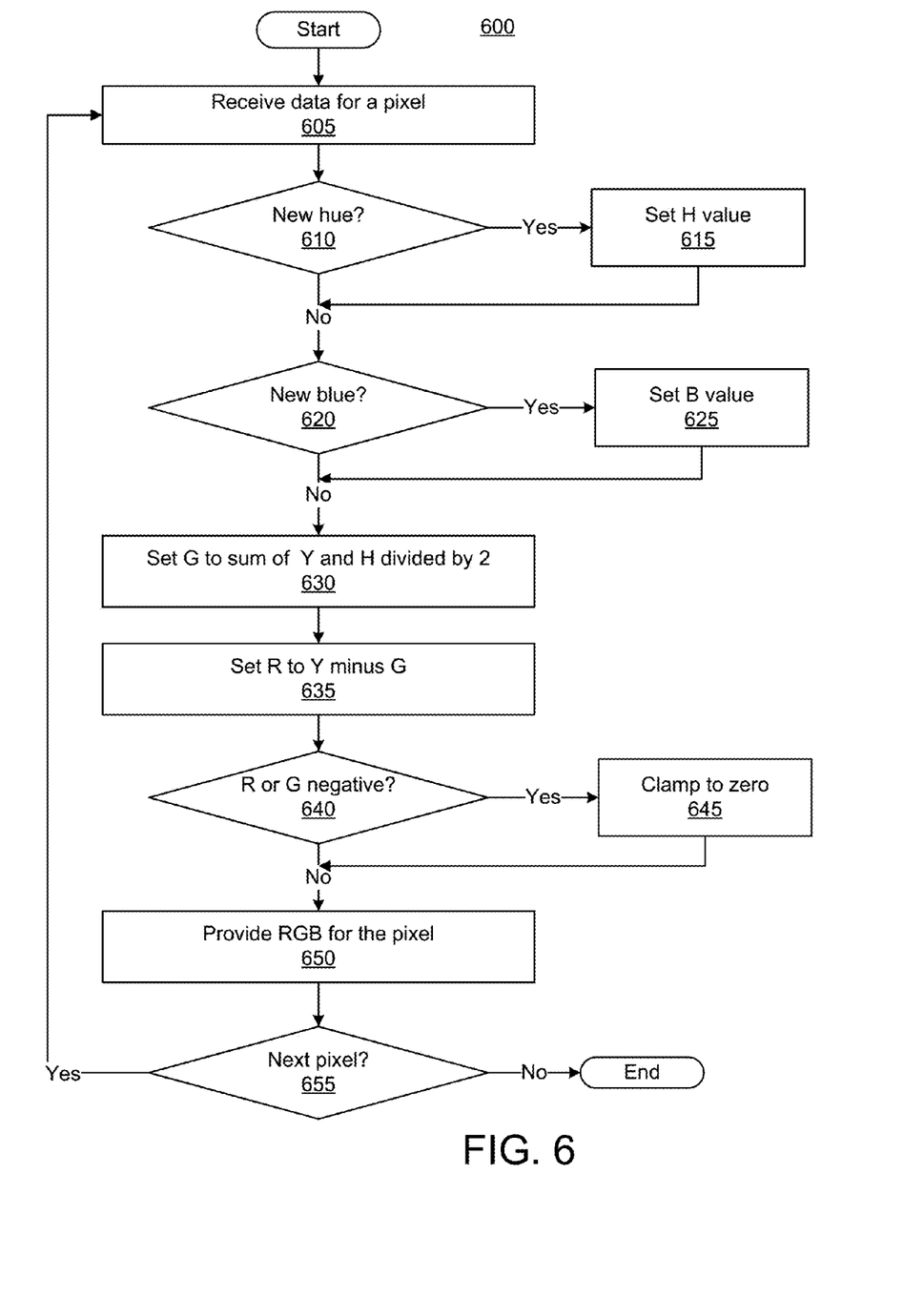
FIG. 6 illustrates a flow diagram of an example process for transforming color information from the YHB color space, according to an implementation.

Returning to FIG. 3, at some subsequent time (represented by the dashed line), the system may decompress the image data (320) in preparation for display of the image on a display device. Decompressing image data is explained in more detail with regard to FIG. 6. FIG. 6 illustrates a flow diagram of an example process 600 for transforming color information from the YHB color space, according to an implementation. Process 600 may be performed by an improved image compression system, such as system 100 of FIG. 1 or system 200 FIG. 2. In some implementations, the process 600 may be performed by YHB color transformer 130. In some implementations, the YHB color transformer may be included in a display device. Process 600 may enable an improved image compression system to transform compressed image data into a format fit for display (e.g., RGB or CYMK). Because some of the image information has been lost, the process 600 may result in artifacts, or distortions of the image. Such artifacts are typically more noticeable the larger the image is displayed (e.g., at a greater zoom factor). Thus, the YHB color format may be most beneficial for smaller display devices, such as those associated with smart phones, tablets, and wearable devices.

The process 600 may begin by receiving compressed data for a pixel (605). The compressed data may be just an intensity value, or may be an intensity value, a hue value, and a blue value. As described above, because of subsampling not every pixel will have an associated hue value or blue value, but every pixel does have an intensity value. Thus, as part of step 605, the system obtains an intensity value for the pixel. If the pixel data includes a hue value (610, Yes), the system may set the hue value (615). Otherwise (610, No), the system may use the hue value from a prior pixel. If the pixel data include a new blue value (620, Yes), the system may set the blue value (625). Otherwise (620, No), the system uses a blue value from a previous pixel.

The system may then transform the intensity value, the hue value, and the blue value into components in the target color system. For example, when transforming from the YHB to RGB color space, the system may set the green component to the sum of the intensity and the hue values and then divide the sum by two (630). This works when the YHB converter subtracted the red value from the green value in calculating the hue. Of course, if the YHB converter subtracted green from red, the sum of the intensity and hue values divided by two may represent the red component. In some implementations, the intensity may be the sum of red, green, and blue. In such implementations, the system may system may first determine the red value (or green value, depending on the implementation) by adding the intensity and hue values, subtracting the blue value and then dividing the result by two.

The system may then calculate the red value (635). This may be accomplished by subtracting the green value from the intensity value. Of course, if the red value was calculated as part of step 630, the system may calculate the green value as part of step 635. If blue is included in the intensity, calculating the red value may include further subtracting the blue value.

If either of the red or green values are negative (640, Yes), the system may clamp the negative value to zero (645), as a negative value is not valid. In some implementations, the system may determine the amount of error and distribute the error among neighboring pixels This process can be referred to as error diffusion and can be performed using conventional techniques. The system may then provide the calculated RGB components for the pixel (650) to the display device, for example via a memory used by the display device. The system may repeat steps 605 to 650 for the remaining pixels in the input file (655, Yes). When no more pixels are left for conversion (655, No), process 600 ends. In some implementations, process 600 may be expressed in terms of a matrix. For example, starting with YHB values, calculating the RGB components of a pixel may be expressed as $$\begin{bmatrix} R \\ G \\ B \end{bmatrix} = \begin{bmatrix} 0.5 & -0.5 & 0 \\ 0.5 & 0.5 & 0 \\ 0 & 0 & 1 \end{bmatrix} \times \begin{bmatrix} Y \\ H \\ B \end{bmatrix}$$

The matrix above calculates the hue as the red component subtracted from the green component. If the system calculates the hue as the green component subtracted from red, the values in the middle row would be swapped with the values in the first row.

Process 600 may be modified when blue is added into the intensity component. For example, when Y=R+B+G and H=G−R, then the system may calculate the green component as (H+Y−B)/2. The matrix calculation may then look like $$\begin{bmatrix} R \\ G \\ B \end{bmatrix} = \begin{bmatrix} 0.5 & -0.5 & -0.5 \\ 0.5 & 0.5 & -0.5 \\ 0 & 0 & 1 \end{bmatrix} \times \begin{bmatrix} Y \\ H \\ B \end{bmatrix}$$

Provided with the current disclosure, the system may be modified to transform the YHB color space into another color space, such as CMYK.

Returning to FIG. 3, the system may decorrelate the decompressed image data (325). As discussed above with regard to step 310 of FIG. 3, the system may have used predictors and/or context modeling on the image data, and the system may now apply those same models in reverse. The image may then be ready for display on a display device (330).

In some implementations, process 300 may be performed on high frequency components of an original image. For example, the system may generate a low frequency version of the original image and a high frequency version of the original image using conventional techniques, such as discrete wavelet transform. The low frequency version represents a blurred variation that typically includes about six percent of the information from the original image. The high frequency version represents sharp edges and carries about 94% of the information from the original image. In some implementations, the system may compress the high frequency version using the YHB color space. The low frequency version can be compressed using conventional color models (e.g., YUV, YCbCr, and Y'CbCr) or using the YHB color model. In implementations where the system uses the YHB color mode to encode the low frequency version the system may add blue into the intensity channel (i.e., the Y channel). Separation of the image into a low frequency version and a high frequency version can result in a 3% improvement in compression for low quality images, such as images used for previews or images for streaming in a mobile environment where quality is sacrificed for higher transfer rates.

In an example where the system generates a low frequency version of the original image and a high frequency version of the original image, the system may use a first variation of the YHB color model on the low frequency version and a different variation of the YHB color model on the high frequency version. For example, the system may use a rotation matrix similar to the one below, i.e., a first variation, for the high frequency version:
[[0.171, −0.0812, 0],
[0.08265, 0.168, 0],
[0, 0, 0.271059]]

When the system compresses the low frequency version, the system may use a second variation of the YHB color model. For example, the system may use a rotation matrix similar to the one below for the low frequency version:
[[0.142, −0.065, 0],
[0.10, 0.12, 0.024],
[0, 0, 0.14]]

The primary difference between the two rotation matrices is the addition of blue (e.g. 0.024) in the hue channel. Other variations of the YHB color model may be used depending on normalization techniques used or different color directions for the YHB space.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, digital cameras, scanners, servers, blade servers, mainframes, and other appropriate computers. Computing device 750 is intended to represent various forms of mobile devices, such as personal digital assistants, cellular telephones, smart phones, wearable devices, such as glasses or watches, digital cameras, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722 or desktop computer 726. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can be any processor formed in a substrate that can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

According to one aspect, a method of generating a compressing an image that includes a plurality of pixels includes storing a sum of an unweighted first color value and an unweighted second color value for each pixel in the plurality of pixels as a first channel, subsampling, among the plurality of pixels, a difference between the first color value and the second color value as a second channel, subsampling, among the plurality of pixels, a third color value as a third channel, and storing the first channel, the second channel, and the third channel as the compressed image.

These and other aspects can include one or more of the following features. For example, the sum of the first channel may be a sum of the first color, the second color, and the third color. As another example, the third color value may be a blue color value. As another example, the method may also include transmitting the compressed image to a second computing device. As another example, the method may also include generating a low frequency version of the image, generating a high frequency version of the image, compressing the low frequency version in a conventional color model, and compressing the high frequency version in the YHB color space by storing of the sums, subsampling the differences, and subsampling the third color values. As another example, subsampling of the second channel can occurs at a higher rate that the subsampling of the third channel. As another example, the method may include decoding the compressed image and providing the decoded image to a display device. As another example, the stored sum for a pixel may be an intensity value and the stored subsampled differences may be hue values and decoding the compressed image can include calculating a first color value as one-half of the sum of the intensity value and a corresponding hue value, calculating a second color value as the difference between the intensity value and the first color value, determining a third color value from a subsampled third color corresponding to the intensity value, and providing the first color value, the second color value, and the third color value for a pixel to a display device.

According to one aspect, an image capture device can include a camera assembly, a processor, and one or more memories. The memories may be configured to store images captured by the camera assembly, each image including a plurality of pixels, each pixel having a first color value, a second color value, and a third color value. The memories may also be configured to store compressed images and instructions that, when executed by the processor, cause the image capture device to perform operations on an image of the images captured by the camera assembly. The operations may include calculating, for each pixel in the image, a sum of the first color value and the second color value, subsampling, among the plurality of pixels for the image, a difference between the first color value and the second color value, subsampling, among the plurality of pixels for the image, a third color value, and storing the sums, the subsampled differences, and the subsampled third color values as a compressed image in the memory.

These and other aspects can include one or more of the following features. For example, the operations can further include transmitting the compressed image to a second computing device. In some such implementations, the image may be one of a series of images in a video stream. As another example, the subsampling can have a rate of 16:1. As another example, the third color value may be a blue color value.

According to one aspect, a method of converting a block of pixels from an image encoded using an RGB color space to a YHB color space includes (a) calculating an intensity value for each pixel in the block by summing a green component and a red component for the pixel; (b) for a first subsample of pixels in the block of pixels, calculating a hue value by determining a difference between the green component and the red component; (c) for a second subsample of pixels in the block pixels, using a blue component for the pixel as a blue value; and (d) storing the intensity values, the subsampled hue value, and the subsampled blue value for the block of pixels.

These and other aspects can include one or more of the following features. For example, the method may also include repeating (a)-(d) for a plurality of blocks of pixels for the image and generating a compressed version of the image based on the converted blocks of pixels for the image. In some such implementations, the method may also include converting a stored image from the YHB color space to the RGB color space by, converting from the YHB color space to the RGB color space can include, for each block of pixels, determining a hue value for the block, determining a blue value for the block, and for each pixel in the block, setting the red component to the sum of an intensity value for the pixel and the hue value for the block divided by two, setting the green component to the intensity value minus the red component, and snapping a negative red component or green component to zero. In some such implementations, the method also includes determining an error based on the negative red component or negative green component and distributing the error among neighboring pixels.

As another example, the block of pixels is a 4×4 block and the first subsample has a sampling rate of 16:1. As another example, the block of pixels is a 4×4 block and the first subsample has a sampling rate between 4:1 and 16:1. As another example, the block of pixels is a 4×4 block and the second subsample has a sampling rate of 16:1. As another example, the image is an original image and the method further includes generating a low frequency version of the original image, generating a high frequency version of the original image, compressing the low frequency version in a conventional color model; and compressing the high frequency version in the YHB color space by repeating (a)-(d) for blocks in the high frequency image. As another example, the image is an original image and the method further includes generating a low frequency version of the original image, generating a high frequency version of the original image, compressing the low frequency version in a first variation of the YHB color space by repeating (a)-(d) for blocks in the low frequency image, and compressing the high frequency version in a second variation of the YHB color space by repeating (a)-(d) for blocks in the high frequency image.

According to one aspect, a method includes generating a low frequency version of an original image and generating a high frequency version of the original image. The method also includes compressing the low frequency version in a first variation of a YHB color space and compressing the high frequency version in a second variation of a YHB color space.

These and other aspects can include one or more of the following features. For example, the first variation and the second variation may represent different color directions for the YHB color space. As another example, the first variation and the second variation may represent different normalization. As another example, the first variation may include the addition of blue to a hue channel of the YHB color space.

According to one aspect, a method includes generating a low frequency version of an original image captured by a camera assembly, generating a high frequency version of the original image, compressing the low frequency version in a conventional color model; and compressing the high frequency version in a YHB color model.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of generating a compressed image of an original image that includes a plurality of pixels, each pixel having a first color value, a second color value, and a third color value, the method comprising:
   storing an unweighted sum of the first color value and the second color value for each pixel in the plurality of pixels as a first channel;
   subsampling, among the plurality of pixels, a difference between the first color value and the second color value as a second channel;
   subsampling, among the plurality of pixels, the third color value as a third channel; and
   storing the first channel, the second channel, and the third channel as the compressed image.

2. The method of claim 1, wherein the sum of the first channel is a sum of the first color, the second color, and the third color.

3. The method of claim 1, further comprising:
   generating a low frequency version of the original image;
   generating a high frequency version of the original image;
   compressing the low frequency version in a conventional color model; and
   compressing the high frequency version in the YHB color space by storing of the sums, subsampling the differences, and subsampling the third color values.

4. The method of claim 1, wherein the third color value is a blue color value.

5. The method of claim 1, wherein the subsampling of the second channel occurs at a higher rate that the subsampling of the third channel.

6. The method of claim 1, further comprising:
   decoding the compressed image; and
   providing the decoded image to a display device.

7. The method of claim 1, wherein the stored sum for a pixel is an intensity value and the stored subsampled differences are hue values and decoding the compressed image includes:
   calculating a first color value as one-half of the sum of the intensity value and a corresponding hue value;
   calculating a second color value as the difference between the intensity value and the first color value;
   determining a third color value from a subsampled third color corresponding to the intensity value; and
   providing the first color value, the second color value, and the third color value for a pixel to a display device.

8. An image capture device comprising:
   a camera assembly;
   a processor; and
   one or more memories configured to store:
      images captured by the camera assembly, each image including a plurality of pixels, each pixel having a first color value, a second color value, and a third color value,
      compressed images, and
      instructions that, when executed by the processor, cause the image capture device to perform operations on an image of the images captured by the camera assembly, the operations including:

calculating, for each pixel in the image, a sum of the first color value and the second color value;
subsampling, among the plurality of pixels for the image, a difference between the first color value and the second color value;
subsampling, among the plurality of pixels for the image, the third color value; and
storing the sums, the subsampled differences, and the subsampled third color values as a compressed image in the memory.

9. The device of claim 8, the operations further including:
transmitting the compressed image to a second computing device.

10. The device of claim 9, wherein the image is one of a series of images in a video stream.

11. The device of claim 8, wherein the subsampling has a rate of 16:1.

12. The device of claim 8, wherein the third color value is a blue color value.

13. A method of converting a block of pixels from an image encoded using an RGB color space to a YHB color space, the method comprising:
(a) calculating an intensity value for each pixel in the block by summing a green component and a red component for the pixel;
(b) for a first subsample of pixels in the block of pixels, calculating a hue value by determining a difference between the green component and the red component;
(c) for a second subsample of pixels in the block pixels, using a blue component for the pixel as a blue value; and
(d) storing the intensity values, the hue value for the first subsample of pixels, and the blue value for the second subsample of pixels for the block of pixels.

14. The method of claim 13, further comprising:
repeating (a)-(d) for a plurality of blocks of pixels for the image; and
generating a compressed version of the image based on the converted blocks of pixels for the image.

15. The method of claim 14, further comprising converting a stored image from the YHB color space to the RGB color space by, for each block of pixels:
determining a hue value for the block;
determining a blue value for the block; and
for each pixel in the block:
setting the red component to the sum of an intensity value for the pixel and the hue value for the block divided by two,
setting the green component to the intensity value minus the red component, and
snapping a negative red component or green component to zero.

16. The method of claim 15, further comprising:
determining an error based on the negative red component or negative green component; and
distributing the error among neighboring pixels.

17. The method of claim 13, wherein the block of pixels is a 4×4 block and the second subsample has a sampling rate of 16:1.

18. The method of claim 13, wherein the block of pixels is a 4×4 block and the first subsample has a sampling rate between 4:1 and 16:1.

19. The method of claim 13, wherein the image is an original image and the method further comprises:
generating a low frequency version of the original image;
generating a high frequency version of the original image;
compressing the low frequency version in a conventional color model; and
compressing the high frequency version in the YHB color space by repeating (a)-(d) for blocks in the high frequency version of the original image.

20. The method of claim 13, wherein the image is an original image and the method further comprises:
generating a low frequency version of the original image;
generating a high frequency version of the original image;
compressing the low frequency version in a first variation of the YHB color space by repeating (a)-(d) for blocks in the low frequency version of the original image; and
compressing the high frequency version in a second variation of the YHB color space by repeating (a)-(d) for blocks in the high frequency version of the original image.

* * * * *